Aug. 25, 1959   H. A. KLASENS   2,901,436
RED LUMINESCENT MATERIAL
Filed Sept. 16, 1954
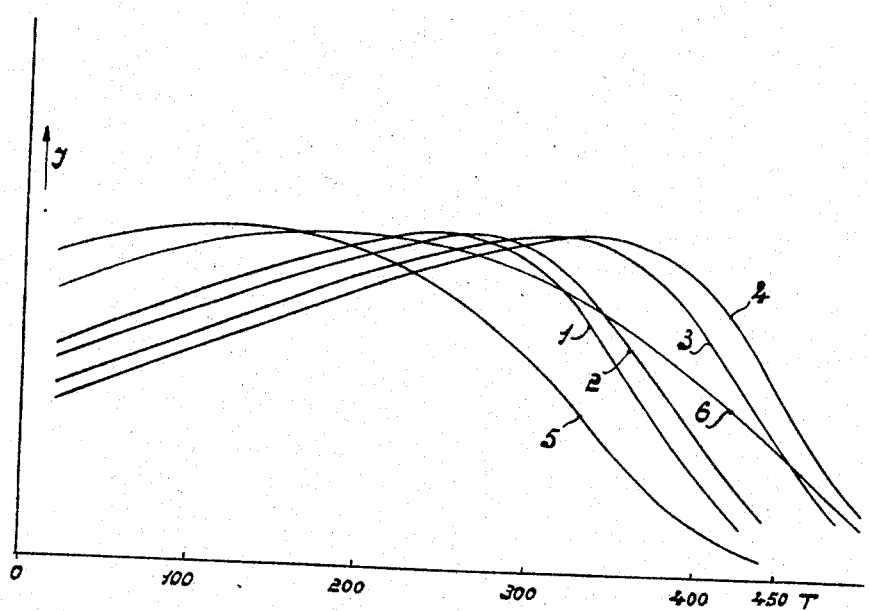
INVENTOR
HENDRIK ANNE KLASENS
BY
AGENT United States Patent Office 2,901,436
Patented Aug. 25, 1959

2,901,436
RED LUMINESCENT MATERIAL

Hendrik Anne Klasens, Eindhoven, Netherlands, assignor, by mesne assignments, to North American Philips Company, Inc., New York, N.Y., a corporation of Delaware Application September 16, 1954, Serial No. 456,510

Claims priority, application Netherlands October 22, 1953

9 Claims. (Cl. 252—301.4)

The invention relates to a luminescent screen having a red luminescent substance. It furthermore relates to a method of producing such a substance and to an electric discharge tube comprising such a screen.

It is known that luminescent substances are nowadays used very frequently for many different purposes. Very important is their use for example in electric gas discharge lamps, in cathode-ray tubes for use in television, oscillography or radar, in luminescent paints and for coating objects which must be visible in the dark, for example knobs of radio apparatus and pointers of measuring instruments.

The colour of the light emitted by the luminescent substances may vary between deep blue and deep red. For practically every colour a number of substances is available to choose from with a view to different requirements for resistability, temperature dependence and so on. However the choice of luminescent substances emitting red light upon being excited by ultraviolet radiation or by electrons has been very limited.

Lately a new red luminescent substance having many favourable properties has been described. This substance is a magnesium arsenate activated by manganese. By accurate examinations it has been found that in this red luminescent substance the ratio between magnesia and arsenic-pentoxide in molecules is 6:1. The production may start, it is true, from such quantities of compounds that the requirement of a ratio of 6:1 is not fulfilled, but the final product is then found to have always more than one phase. If the ratio between magnesia and arsenic-pentoxide is lower than 6:1, a two-phase system containing $Mg_3As_2O_8$, having no or substantially no luminescence, is produced in addition to the red luminescent $Mg_6As_2O_{11}$. If the ratio is higher than 6:1, a two-phase system containing the red luminescent $Mg_6As_2O_{11}$ mixed with MgO is produced. In all these substances the quantity of manganese may vary from between 0.001 to 0.1 atom per $Mg_6As_2O_{11}$ molecule.

The presence of $Mg_3As_2O_8$ or of MgO in addition to the $Mg_6As_2O_{11}$ is disturbing only in that the luminous output of the two-phase systems is smaller than that of the pure $Mg_6As_2O_{11}$. It has been found that the $Mg_3As_2O_8$ has a greater disturbing effect than the MgO. This may be accounted for by the considerably greater absorption of the radiation exciting the luminescent substance with the first-mentioned compound than with the MgO.

As stated above, the $Mg_6As_2O_{11}$ has many favorable properties. For practical purposes one of the most important is the satisfactory temperature dependence of the intensity of the emitted radiation, i.e. even at higher temperatures a great quantity of light is emitted. This is of particular importance, if the arsenate is used in conjunction with gas discharge tubes, more particularly high-pressure mercury vapour discharge tubes. With the latter tubes the discharge vessel proper is, in general, housed in a bulb envelope which is usually coated internally with the luminescent substance. Since the discharge tube produces a very great quantity of heat the bulb envelope becomes very hot under normal conditions. It is therefore necessary to provide a definite minimum dimension for the bulb, since most luminescent substances exhibit a strongly reduced luminous output with a temperature exceeding about 100° C. However, the red luminescent arsenate described above maintains its high luminous output up to a temperature of about 250° C. For high wattages (exceeding 250° C.), however, it is still required to use such a large bulb that the arrangement of the lamp in lighting fittings gives rise to difficulties. It is therefore desirable, for the last-mentioned purpose and other purposes, to have a red luminescent substance available which has a further improved temperature dependence. A luminescent screen prepared according to the invention contains such a substance.

A luminescent screen according to the invention contains red luminescent material which comprises mainly a magnesium lithium arsenate activated by manganese, which fulfills the formula:

$$x\,MgO \cdot y\,Li_2O \cdot z\,As_2O_5 \cdot p\,Mn$$
$$(x+2y):z=6:1 \text{ and}$$

wherein $y:z$ lies between 0.1 and 1.0 and
$p:z$ lies between 0.001 and 0.1 wherein X, Y and Z represent the number of moles of the corresponding oxides and $p$ represents the number of atoms of manganese.

The difference from the known red luminescent arsenate relates consequently only to the presence of the lithium in the luminescent substance. It was a surprise to find that the ratio between the sum of the number of atoms of magnesium and lithium and the number of atoms of arsenic must be 3:1. Apparently the lithium replaces part of the magnesium in the lattice.

From comparison experiments it is found that the ratio $y:z$ is 4:10 provides the best temperature dependence. The quantity of manganese is preferably chosen to be such that $p:z$ is 1:100.

For the sake of completeness it should be noted that most further properties of the magnesium-lithium arsenate are substantially equal to those of the corresponding magnesium arsenate. The substance may, for example be excited both by a radiation having a wavelength of 2537 A and with a wavelength of 3650 A; the emitted radiation has a maximum between 6300 A and 6700 A. A further difference between the arsenate containing lithium and that not containing lithium is that the former has a greater chemical resistance.

The red luminescent substance for use in a luminescent screen according to the invention may be produced in different ways. It is essential, however, that the substance should be fired in an oxidizing atmosphere preferably to more than 500° C. This depends presumably upon the oxidation condition of the manganese in the substance.

The manganese activated magnesium lithium arsenate may be formed of such quantities of magnesium, lithium and arsenic compounds that subsequent to the firing step the ratio of (Mg+Li):As in the reaction product is not equal to 3:1. It is then found, however, that also in this case two phases occur side by side, i.e. either $Mg_3As_2O_8$, or MgO in addition to the red luminescent component. It is remarkable however, that, although the red luminescent component has a ratio of (Mg+Li):As=3:1, the production may sometimes start preferably from such quantities of raw material in which this ratio exceeds 3:1. Then often a product of improved luminous output is obtained as compared with a product obtained from quantities of raw material calculated exactly for a ratio 3:1. If desired, the red luminescent component may be separated out of the reaction mixture.

Particularly satisfactory results are obtainable, if in the production of the arsenates according to the invention use is made of fluorine or boron containing compounds, for example magnesium fluoride or boron trioxide, as a flux. From analysis of the compounds thus produced it has been found that part of the fluorine or boron of the flux is present in the final product. The use of the flux results in an improved crystallisation condition, a reduction of the production temperature and a shorter firing time.

In a luminescent screen according to the invention other luminescent substances may occur in addition to the red luminescent substance, these substances having their maximum emission in the same or in other parts of the spectrum.

The invention will now be explained more fully with reference to a few examples of production methods.

In all production methods use is made of starting material of high purity, as is common practice to do with the production of luminescent substances. Care is furthermore taken that the substances have a high degree of division in order to obtain a satisfactory reactivity. Very small quantities of alien substances, which cannot or substantially not be detected by analysis have in general no disturbing effect: they must be regarded as unavoidable impurities.

*Example I*

A mixture is made from:
360 g. of MgO
14.8 g. of $Li_2CO_3$
230 g. of $As_2O_5$
2.3 g. of $MnCO_3$ This mixture is ground in 1.5 liters of water in a ball mill. Then the suspension obtained is evaporated to dryness and the dry substance is heated to a temperature of about 600° C. in air or oxygen for one hour. Then heating is continued at a temperature of 1200° C. also in air or oxygen for 16 hours.

*Example II*

A mixture is made from:
215 g. of MgO
22.2 g. of $Li_2CO_3$
230 g. of $As_2O_5$
1.1 g. of $MnCO_3$
6.2 g. of $MgF_2$ The mixture is ground with the addition of 1.5 litres of alcohol in a ball mill. The suspension obtained is evaporated to dryness and the dry substance is pre-fired in air to a temperature of about 600° C. for one hour. Then heating is continued to a temperature of 1100° C. also in air for three hours.

*Example III*

A mixture is made from:
215 g. of MgO
22.2 g. of $Li_2CO_3$
230 g. of $As_2O_5$
1.1 g. of $MnCO_3$
3.0 g. of $B_2O_3$ With the addition of water this mixture is ground in a ball mill. The suspension obtained is evaporated to dryness and the dry product is heated in air to a temperature of 600° C. for ten hours. Then heating is continued in air or in an oxygen atmosphere to about 1100° C. for 16 hours.

*Example IV*

The starting material is 200 g. of $As_2O_3$.

This oxide is mixed with water; to the suspension obtained is added 0.5 liter of 30% $H_2O_2$. This suspension is heated slowly up to the boiling temperature until all arsenic oxide is dissolved. After cooling; the substance is filtered and the filtrate is put into an evaporation dish. Under constant stirring 250 g. of MgO, 29.6 g. of $Li_2CO_3$ and 1.1 g. of $MnCO_3$ is added in portions. The suspension is evaporated to dryness and the dry substance is pre-fired in air to a temperature of about 600° C. for three hours. Then heating is continued in air or in oxygen at a temperature of about 1200° C. for about 16 hours.

The substances obtained subsequent to heating, as indicated in the example above, are, if necessary, ground and sifted and are then ready for use. They may for example be applied to the wall of a discharge tube, to a reflector, to the knob of a radio apparatus or to the pointer of a measuring instrument. They are then particularly suitable for use on the inner side of a bulb surrounding a high-pressure mercury vapor discharge tube.

The accompanying drawing shows graph in which the luminous output of various red luminescent substances according to the invention, excited by 3650 A is plotted in arbitrary units on the ordinate. The temperature in degrees centigrade is plotted on the abscissa of the graph. The curves in the graph are designated by 1 to 6 and from the following table it can be seen how the substances yielding these curves are composed.

|   | MgO | $As_2O_5$ | $Li_2O$ | Mn |
|---|---|---|---|---|
| 1 | 6 | 1 | ------- | 0.01 |
| 2 | 5-8 | 1 | 0.1 | 0.01 |
| 3 | 5.4 | 1 | 0.3 | 0.01 |
| 4 | 5.2 | 1 | 0.4 | 0.01 |
| 5 | 6 | 1 | ------- | 0.05 |
| 6 | 5.4 | 1 | 0.3 | 0.05 |

From the curves it is obvious that the temperature dependence of the compounds containing lithium is materially better than that of the compounds not containing lithium. It is furthermore evident that the best temperature dependence is obtained by a compound containing about 0.4 mol of $Li_3O$ per molecule of $As_2O_5$. Both in the compounds containing lithium and in the compounds not containing lithium a manganese content of 0.01 yields better results than a manganese content of 0.05.

What is claimed is:

1. A red luminescent material consisting essentially of a magnesium lithium arsenate activated by manganese and corresponding to the formula $$xMgO \cdot yLi_2O \cdot zAs_2O_5 \cdot pMn$$

wherein $(x+2y):z = 6:1$ and
$y:z$ lies between 0.1 and 1.0 and
$p:z$ lies between 0.001 and 0.1.

2. The red luminescent material of claim 1 wherein $y:z=0.4$.

3. The red luminescent material of claim 1 wherein $p:z=0.01$.

4. A method of producing a red luminescent material comprising the steps of mixing magnesium, arsenic, lithium and manganese compounds in proportions yielding upon firing a product containing lithium oxide and arsenic pentoxide in a mole ratio that is at least 0.1:1.0 and not greater than 1:1, magnesium oxide, lithium oxide and arsenic pentoxide in a mole ratio such that the ratio of the number of moles of the magnesium oxide plus twice the number of moles of the lithium oxide to the number of moles of the arsenic pentoxide is 6:1 and manganese is present in the proportions of about 0.1 to 10 atom percent based on the number of moles of the arsenic pentoxide and firing said mixture at a temperature exceeding 500° C. in an oxidizing atmosphere for a time sufficient to form said oxides.

5. The method of claim 4 wherein the heating takes place in the presence of a flux.

6. The method of claim 5 in which the flux is a fluorine compound.

7. The method of claim 5 in which the flux is a boron compound.

8. The method of claim 6 in which the flux is magnesium fluoride.

9. The method of claim 8 in which the flux is boron trioxide.

References Cited in the file of this patent

UNITED STATES PATENTS

| | | |
|---|---|---|
| 2,488,733 | McKeag | Nov. 22, 1949 |
| 2,615,848 | Wells | Oct. 28, 1952 |
| 2,668,252 | Ouweltjes | Feb. 2, 1954 |
| 2,688,600 | Travnicek | Sept. 7, 1954 |

FOREIGN PATENTS

| | | |
|---|---|---|
| 628,308 | Great Britain | Aug. 25, 1949 |

OTHER REFERENCES

Kroger: Some Aspects of the Luminescence of Solids, page 271 (1948).

Smith College Chemistry, 1946 pp. 600–602.

UNITED STATES PATENT OFFICE
Certificate of Correction

Patent No. 2,901,436

August 25, 1959

Hendrik Anne Klasens

It is hereby certified that error appears in the printed specification of the above numbered patent requiring correction and that the said Letters Patent should read as corrected below.

Column 2, line 21, for "$(x+2y):z=6:1$ and" read —wherein $(x+2y):z=6:1$ and—; line 22, strike out "wherein"; column 4, line 15, after "shows" insert —a—; line 38, for "$Li_2O$" read —$Li_2O$—.

Signed and sealed this 24th day of May 1960.

[SEAL]

Attest:
KARL H. AXLINE,
*Attesting Officer.*

ROBERT C. WATSON,
*Commissioner of Patents.*